June 21, 1960 S. SENGLET 2,941,446

ARRANGEMENT FOR DEFINING ACCURATELY THE LONGITUDINAL POSITION OF A QUILL

Filed Feb. 20, 1958 2 Sheets-Sheet 1

June 21, 1960

S. SENGLET 2,941,446

ARRANGEMENT FOR DEFINING ACCURATELY THE LONGITUDINAL POSITION OF A QUILL

Filed Feb. 20, 1958

United States Patent Office 2,941,446
Patented June 21, 1960

2,941,446

ARRANGEMENT FOR DEFINING ACCURATELY THE LONGITUDINAL POSITION OF A QUILL

Serge Senglet, Geneva, Switzerland, assignor to Societe Genevoise d'Instruments de Physique, Geneva, Switzerland, a firm of Switzerland Filed Feb. 20, 1958, Ser. No. 716,412

Claims priority, application Switzerland Nov. 15, 1957

7 Claims. (Cl. 88—24)

The present invention has for its object a machine-tool of the type including, on the one hand, at least one headstock having an axially shiftable sleeve inside which is revolubly mounted a tool-carrying spindle and, on the other hand, an arrangement for measuring said axial shifting. According to the invention, there is provided a scale-carrying rod sliding inside the headstock in parallelism with the axis of the spindle and connected with the sleeve in a manner such that it may follow the movement of the latter, an optical system providing for the projection of an enlarged image of said scale on a screen, while means are provided for measuring accurately the position of the images of the subdivisions or indications carried by said scale onto said screen.

I have illustrated by way of example in the accompanying drawings a preferred embodiment of the invention, as applied to a jig borer. In said drawings.

Figure 1:
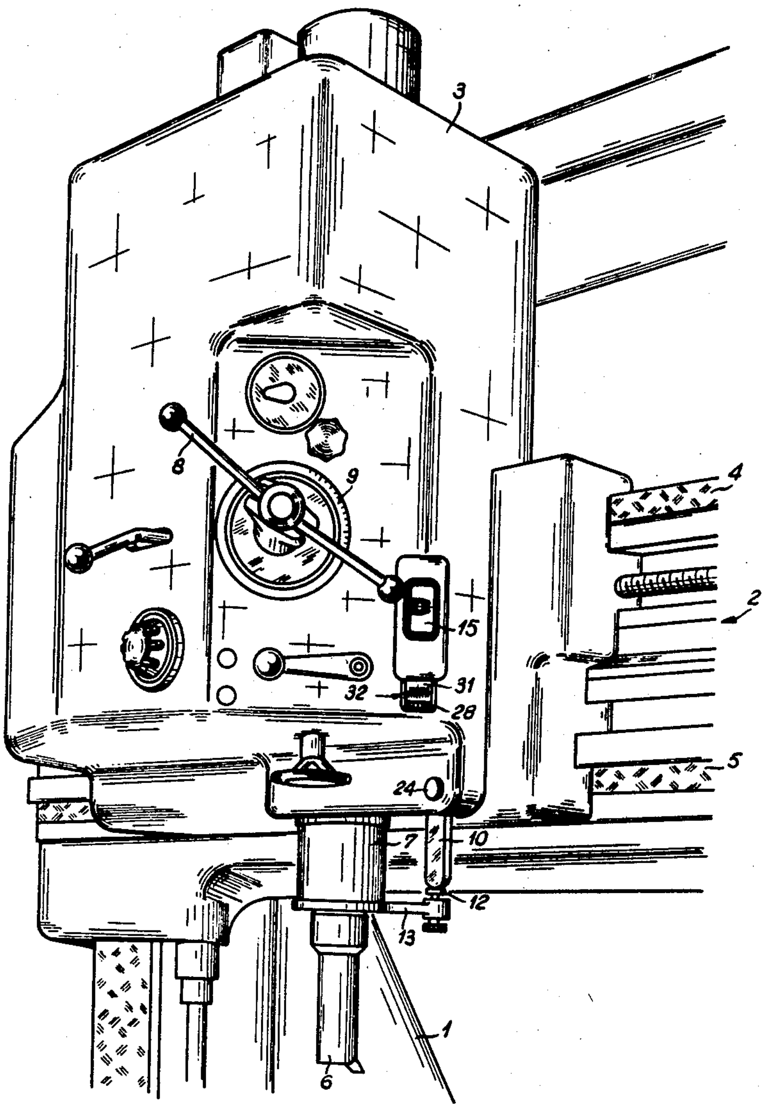
Fig. 1 is a general view of a headstock carried on a carriage of the jig borer.

The machine-tool constituted by a jig borer includes, as illustrated, a frame 1 of which only the upper section is shown on Fig. 1. On said frame is mounted a carriage 2 adapted to move axially and carrying a headstock 3 sliding horizontally over the carriage along the slideways 4 and 5.

The headstock includes a vertical tool-carrying spindle 6 revolubly fitted in a sleeve 7 which is axially shiftable. 8 designates a rotary handle or swivel for the manual shifting of said sleeve and engagement of the automatic feed of the latter. The dial 9 associated with the rotary handle provides an approximative measurement of the axial shifting of the spindle.

Figure 2:
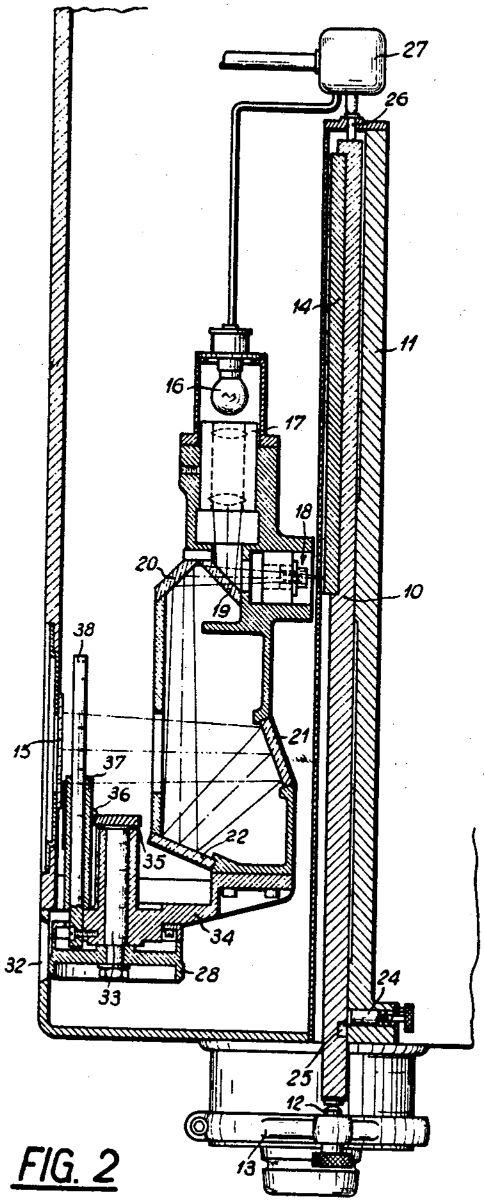
Fig. 2 is a partial vertical sectional view of said headstock through the means measuring the axial shifting of the spindle.
Figure 3:
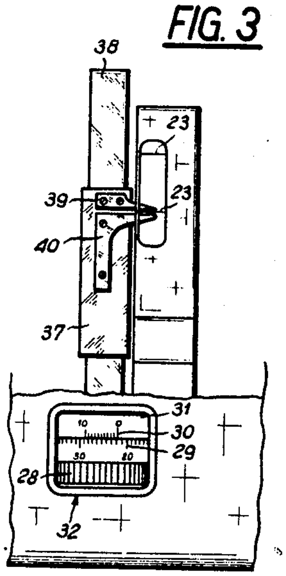
Fig. 3 is an elevational view of a detail of said arrangement.

The accurate measuring means for said axial shifting of the spindle include a rod 10 sliding freely in parallelism with the axis of the spindle in a slideway 11 fitted inside the headstock (Fig. 2). The lower end of said rod 10 projects beyond the lower surface of the headstock and bears on a stop constituted by a screw 12 coaxially engaging said rod and threadedly engaging a radial arm 13 removably fitted round the sleeve and moving with the latter. The upper end of the rod 10 carries longitudinally a standard highly accurate rule 14 carrying a centimetric or the like scale and remaining permanently, whatever may be the position of the rod, inside the headstock, so as to be protected against the corrosive action of the dust and the like impurities carried by the air.

The enlarged image of the scale carried by said rule is projected through optical means on a screen 15 carried by the headstock. Said optical means include a source of light constituted by a lamp 16, a condenser 17, an objective 18 through which the rule may thus be observed and, lastly, a semi-transparent and semi-reflecting blade 19 associated with three mirrors 20, 21 and 22. The image of at least one subdivision 23 of said scale and of two subdivisions at the utmost will appear on the screen, whatever may be the position of the rod 10, said scale being shifted vertically together with the rod.

A locking device including a bolt 24 may temporarily engage a recess 25 provided in the rod 10, so as to allow a locking of the latter in an inoperative position in which it has entirely collapsed inside the headstock. When the rod has entered this upper inoperative position, its upper end shifts axially a push member 26 controlling a switch 27 which breaks the circuit energizing the source of light 16.

The vertical location of each image 23 of a scale subdivision appearing on the screen may be measured accurately through means provided for this purpose. The latter include a rotary drum 28 carrying a scale 29 allowing a measure with an accuracy within one micron, said scale being arranged in registry with a vernier 30 carried by a stationary drum 31 and visible with the latter through a gate 32 provided underneath the screen. Said drum 28 is fitted rigidly on the lower end of a vertical stem 33 revolubly carried in a support 34 rigid with the headstock. Said stem carries at its upper end a micrometric toothed or threaded section 35 controlling a rack 36 rigid with the slider 37 guided by the guiding member 38 and carrying a pointer constituted by two adjacent superposed noses 39 and 40. These two noses when brought into registry with an image of a scale subdivision allow an accurate centering of said image.

When measuring the axial shifting of the tool-carrying spindle, for instance during the drilling or boring of a highly accurate hole, the spindle should first be brought into its approximate starting position through observation of the scale on the dial 9 cooperating with the handle 8. The accurate measuring means are returned to zero if necessary, so as to make the zero of the drum register with the zero of the vernier, after which the rod 10 is axially shifted through the screw 12, so as to center the image on the screen of one of the scale subdivisions carried by the rule at 23 in registry with the gap separating the noses 39 and 40. The drum is then actuated, so as to show the measurement required for the final position of the tool. The spindle is then shifted into a position adjacent the position corresponding to said measurement through action on the handle 8 cooperating with the dial 9 and the spindle is thenafter brought into its final accurate position through a centering of the corresponding line on the reference rule between the two noses forming the thus shifted pointer 39—40.

When the optic measuring system is not in use, the rod 10 is raised inside the headstock, so as to be brought into its inoperative position in which it is locked by the bolt 24. The circuit of the lamp 16 is then automatically broken by the switch 27.

The invention is obviously not limited to the arrangement described and the measuring system for the axial shifting of the spindle may, for instance, be adapted to a horizontal tool-carrying spindle. In such a case, the rod 10 would engage a stop rigid with the sleeve 7, no longer under the action of its own weight, but under the action of a counterweight or of a spring, for instance.

What I claim is:

1. An arrangement for defining the longitudinal position with reference to a stationary support of an elongated axially shiftable quill holding a tool-carrying spindle, said arrangement including a rod slidingly carried by the support and movable therein along a line parallel with the axis of the quill, a highly accurate scale arranged longitudinally of said rod rigidly carried on the latter and remaining permanently inside the support during the travel of the rod between two extreme positions allowed for the latter, a stop moving in unison with the quill and projecting laterally with reference thereto, said rod being urged permanently against said stop to move longitudinally in unison with the quill, a screen carried by the support and visible from the outside of the latter, an optical system also carried by the support and producing an enlarged image of the scale on said screen, and means for measuring accurately the location of the image of the scale subdivisions on said screen.

2. An arrangement for defining the longitudinal position with reference to a stationary support of an elongated axially shiftable vertical quill holding a tool-carrying spindle, said arrangement including a rod slidingly carried by the support and movable therein along a line parallel with the axis of the quill, a highly accurate scale arranged longitudinally of said rod, rigidly carried on the latter and remaining permanently inside the support during the travel of the rod between two extreme positions allowed for the latter, a stop moving in unison with the quill and projecting laterally with reference thereto, said rod being urged permanently against said stop under the action of its weight to move longitudinally in unison with the quill, a screen carried by the support and visible from the outside of the latter, an optical system also carried by the support and producing an enlarged image of the scale on said screen, and means for measuring accurately the location of the image of the scale subdivisions on said screen.

3. An arrangement for defining the longitudinal position with reference to a stationary support of an elongated axially shiftable vertical quill holding a tool-carrying spindle, said arrangement including a rod slidingly carried by the support and movable therein along a line parallel with the axis of the quill, a highly accurate scale arranged longitudinally of said rod, rigidly carried on the latter and remaining permanently inside the support during the travel of the rod between two extreme positions allowed for the latter, a stop moving in unison with the quill and projecting laterally with reference thereto, a weight urging permanently the rod into engagement with said stop to make it move longitudinally in unison with the quill, a screen carried by the support and visible from the outside of the latter, an optical system also carried by the support and producing an enlarged image of the scale on said screen, and means for measuring accurately the location of the image of the scale subdivisions on said screen.

4. An arrangement for defining the longitudinal position with reference to a stationary support of an elongated axially shiftable quill holding a tool-carrying spindle, said arrangement including a rod slidingly carried by the support and movable therein along a line parallel with the axis of the quill, a highly accurate scale arranged longitudinally of said rod, rigidly carried on the latter and remaining permanently inside the support during the travel of the rod between two extreme positions allowed for the latter, a radial arm removably secured to the quill at a predetermined point of its length, a stop threadedly fitted on the end of said arm coaxially with the rod and engaging the latter to define through its screwing the position of the rod with reference to a zero position, said rod being urged permanently against said stop to move longitudinally in unison with the quill, a screen carried by the support and visible from the outside of the latter, an optical system also carried by the support and producing an enlarged image of the scale on said screen, and means for measuring accurately the location of the image of the scale subdivisions on said screen.

5. An arrangement for defining the longitudinal position with reference to a stationary support of an elongated axially shiftable vertical quill holding a tool-carrying spindle, said arrangement including a rod slidingly carried by the support and movable therein along a line parallel with the axis of the quill, a highly accurate scale arranged longitudinally of said rod, rigidly carried on the latter and remaining permanently inside the support during the travel of the rod between two extreme positions allowed for the latter, a radial arm removably secured to the quill at a predetermined point of its length, a stop threadedly fitted on the end of said arm coaxially with the rod and carrying the latter to define through its screwing the position of the rod with reference to a zero position, said rod being urged parmenently against said stop to move longitudinally in unison with the quill, a screen carried by the support and visible from the outside of the latter, an optical system also carried by the support and producing an enlarged image of the scale on said screen, and means for measuring accurately the location of the image of the scale subdivisions on said screen.

6. An arrangement for defining the longitudinal position with reference to a stationary support of an elongated axially shiftable quill holding a tool-carrying spindle, said arrangement including a rod slidingly carried by the support and movable therein along a line parallel with the axis of the quill, a highly accurate scale arranged longitudinally of said rod rigidly carried on the latter and remaining permanently inside the support during the travel of the rod between two extreme positions allowed for the latter, a stop moving in unison with the quill and projecting laterally with reference thereto, said rod being urged permanently against said stop to move longitudinally in unison with the quill, a screen carried by the support and visible from the outside of the latter, an optical system also carried by the support and producing an enlarged image of the scale on said screen, means for measuring accurately the location of the image of the scale subdivisions on said screen, and means for locking the rod in an inoperative position for which it is entirely contained inside the support and is held away from the stop.

7. An arrangement for defining the longitudinal position with reference to a stationary support of an elongated axially shiftable quill holding a tool-carrying spindle, said arrangement including a rod slidingly carried by the support and movable therein along a line parallel with the axis of the quill, a highly accurate scale arranged longitudinally of said rod, rigidly carried on the latter and remaining permanently inside the support during the travel of the rod between two extreme positions allowed for the latter, a stop moving in unison with the quill and projecting laterally with reference thereto, said rod being urged permanently against said stop to move longitudinally in unison with the quill, a screen carried by the support and visible from the outside of the latter, an optical system also carried by the support and producing an enlarged image of the scale on said screen, an electric source of light carried by the support and illuminating said optical system, a circuit feeding same, a switch controlling the circuit and controlled by the rod to close whenever the rod lies within a predetermined area corresponding to operative registration between the optical system and a predetermined portion of the scale, and means for measuring accurately the location of the image of the scale subdivisions on said screen.

References Cited in the file of this patent

UNITED STATES PATENTS

| | | |
|---|---|---|
| 2,564,068 | Kearns | Aug. 14, 1951 |
| 2,581,823 | Turrettini | Jan. 8, 1952 |
| 2,809,540 | Schultze | Oct. 15, 1957 |
| 2,812,671 | Mottu | Nov. 12, 1957 |